No. 640,049. Patented Dec. 26, 1899.
G. W. TERRY & E. H. STOWELL.
WIRE TIGHTENING DEVICE.
(Application filed Feb. 8, 1899.)
(No Model.)
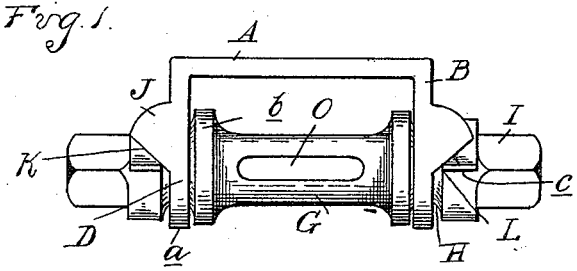
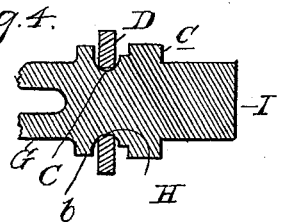
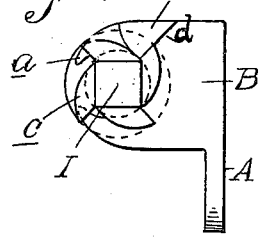
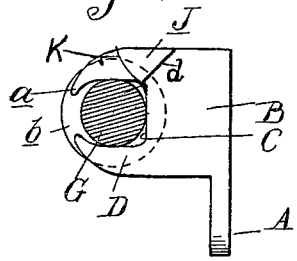
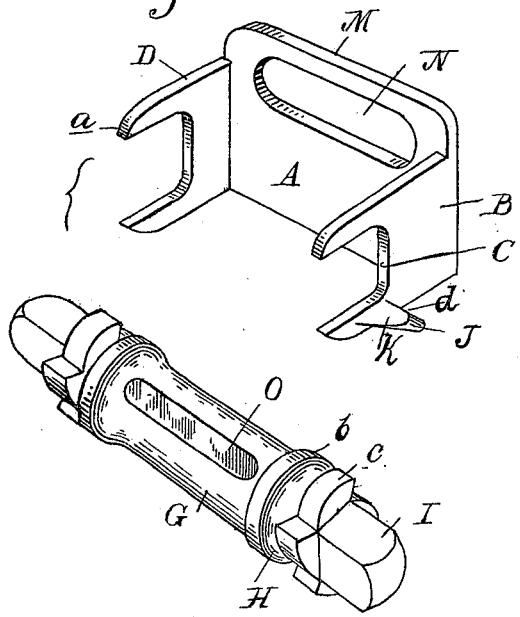
Witnesses
A. L. Hubby
H. C. Smith
Inventors
George W. Terry
Elmer H. Stowell
By their Attys.

UNITED STATES PATENT OFFICE.

GEORGE W. TERRY AND ELMER H. STOWELL, OF PONTIAC, MICHIGAN.

WIRE-TIGHTENING DEVICE.

SPECIFICATION forming part of Letters Patent No. 640,049, dated December 26, 1899.

Application filed February 8, 1899. Serial No. 704,957. (No model.)

*To all whom it may concern:*

Be it known that we, GEORGE W. TERRY and ELMER H. STOWELL, citizens of the United States, residing at Pontiac, in the county of Oakland and State of Michigan, have invented certain new and useful Improvements in Wire-Tightening Devices, of which the following is a specification, reference being had therein to the accompanying drawings.

The invention consists in the construction of a wire-tightening device; and it consists in the construction of such a device comprising a bracket and a spool journaled in the bracket, the journal-bearing being such a one as will permit the rotation of the spool and at the same time guiding it in a rising-and-falling movement, and to this end we form the bearing of malleable posts extending from opposite ends of the journals of the spool and having at the upper end inturned tip portions, which act to hold the spool in the bearing.

The invention further consists in the construction, arrangement, and combination of the various parts, all as more fully hereinafter described.

In the drawings, Figure 1 is a top plan view of our invention. Fig. 2 is an end elevation thereof. Fig. 3 is a similar elevation showing the spool in section. Fig. 4 is a longitudinal section through one end of the spool and one journal, and Fig. 5 is a perspective view of the two parts of the tightener detached.

The bracket comprises the supporting-plate A and the end plates or journal-plates B, the end plates extending at right angles to the supporting-plate at the ends thereof and at their upper ends are provided with the journal-bearings C. Upon each side of these journal-bearings or at each end thereof are the posts or fingers D. These posts or fingers are of a greater length than is necessary for simply permitting the spool to turn therein, the extension being sufficient to allow the spool to have a sliding movement upon the posts and also sufficient in length to permit of the tips or end portions $a$ being bent inward after the journal is in position, as shown in Fig. 3, to hold it from falling out therefrom. This we do by making the posts or the tips of malleable metal and bending the tips over after the spool is in place in its journal-bearing. We prefer to make the portions $a$ by reducing the ends of the posts or tapering them, so that they may be more readily inturned and so that only the upper portion will turn inward under the operation of the tool instead of the entire post bending, which would have a tendency to bind the spool in its bearing.

G is the spool. At its ends it has the journals H, which fit in the journal-bearing, and at each end it has the squared portion I, forming a wrench-hold. The spool has the flange $b$ at its end, and an extension beyond the journal-bearing is provided with the inclined teeth $c$, adapted to bear against the lugs J, cast integral with the end plates of the bracket, as plainly shown in the drawings. As will be seen by an inspection of Fig. 4, this construction forms a reduced journal and upon opposite sides of the posts flanges or enlargements on the spool, which act to tie the end plates of the brackets together, so that they cannot spread under the action of the tension of the wire should it draw unevenly from one side to the other. This is a desirable construction, because it enables us to make the device much lighter. This is one of the great considerations in manufacturing tools of this kind, for they are usually sold by the pound, or at a very small profit upon their actual weight.

The lug J has the bearing-face K, against which the ratchet-teeth are adapted to bear, and this bearing-face is inclined, as shown in Fig. 1, so that only one point or one end of each ratchet-tooth has contact therewith. This point of contact is shown at L in Fig. 1. This greatly reduces the friction in operating the device. The locking-face of the lugs has a flat face, as shown at $d$, Fig. 5, against which the full face of the tooth squarely engages, and thus makes a complete and positive lock, notwithstanding the small friction in turning the spool to wind the wire. This construction permits us to make the device of malleable metal very light, makes them extremely easy to operate, and positive in their locking qualities, besides having a number of other advantages, such as lightness, &c., which make it an extremely desirable article for the trade.

In use, the bracket is supported, as, for instance, by driving a staple over the cross-bar M, which is formed integral with the base-plate, the end of the wire passes through the aperture N beneath the cross-bar and engages with the aperture O in the spool, and a wrench is applied to one or both of the wrench-holds, and then a rotation of the spool will wind the wire about in and effect the wire tightening and stretching.

What we claim as our invention is—

1. In a wire-tightener, the combination of a spool having journals thereon on opposite ends, of a bracket having a supporting-plate and end plates extending therefrom, malleable fingers extending up from the edges of the ends and forming a journal-bearing between, sufficiently long to permit a turning and sliding movement of the spool without binding, the integral inturned tips on the upper ends of the fingers, acting as stops to prevent the journals of the spool from disengaging therefrom, and a ratchet-and-pawl engagement between the spool and the bracket.

2. In a wire-tightener, the combination of a spool having journals thereon on opposite ends, a bracket comprising a supporting-plate and end plates extending therefrom, malleable fingers extending up from the sides of the end plates and forming an elongated journal-bearing between, in which the spool can turn and slide in or out, inturned integral tips on the post overhanging the journals of the spool, permitting the turning and sliding movements, but preventing disengagement of the spool, integral ratchet-teeth upon the ends of the spool and the lugs J against which said teeth bear and with which it is adapted to lock in its rotation.

In testimony whereof we affix our signatures in presence of two witnesses.

GEORGE W. TERRY.
ELMER H. STOWELL.

Witnesses:
F. L. PERRY,
T. W. CHAFFEE.